United States Patent [19]

Opperman et al.

[11] Patent Number: 5,509,956
[45] Date of Patent: Apr. 23, 1996

[54] REGENERATIVE APPARATUS FOR RECOVERY OF VOLATILES

[75] Inventors: Stephen H. Opperman, Ludington, Mich.; Mark S. Arsenault, Crestwood, Ky.

[73] Assignee: Horizon Holdings, Inc., Crestwood, Ky.

[21] Appl. No.: 273,048

[22] Filed: Jul. 8, 1994

[51] Int. Cl.$^6$ .......................... B01D 53/04; B01D 53/12
[52] U.S. Cl. ................ 95/109; 34/259; 95/141; 95/143; 96/123; 96/130; 96/143; 96/146; 96/150; 219/691
[58] Field of Search ............... 34/259, 265; 95/95, 95/10–106, 108–111, 115, 120, 123, 125; 96/123, 130, 143, 144, 146, 150; 219/678, 690, 691

[56] References Cited

U.S. PATENT DOCUMENTS

| | | | |
|---|---|---|---|
| 2,413,771 | 1/1947 | Luáces | 96/130 X |
| 2,428,885 | 10/1947 | Luáces | 96/130 X |
| 2,519,296 | 8/1950 | Simpson | 96/130 X |
| 2,626,675 | 1/1953 | Maher | 96/144 |
| 2,830,672 | 4/1958 | Asker | 96/144 |
| 3,768,232 | 10/1973 | Farber et al. | 95/106 |
| 3,771,234 | 11/1973 | Forster et al. | 34/1 |
| 3,942,960 | 3/1976 | Girard | 96/130 X |
| 4,094,652 | 6/1978 | Lowther | 96/143 |
| 4,147,523 | 4/1979 | Izumo | 55/208 |
| 4,203,958 | 5/1980 | Snarski | 96/130 X |
| 4,208,806 | 6/1980 | Manser et al. | 34/259 |
| 4,259,094 | 3/1981 | Nagai et al. | 55/181 |
| 4,312,640 | 1/1982 | Verrando | 55/33 |
| 4,312,641 | 1/1982 | Verrando et al. | 55/33 |
| 4,322,223 | 3/1982 | Christel, Jr. | 96/130 X |
| 4,322,394 | 3/1982 | Mezey et al. | 423/244 |
| 4,338,102 | 7/1982 | Otsuka et al. | 34/259 X |
| 4,414,003 | 11/1983 | Blaudszun | 96/130 X |
| 4,421,532 | 12/1983 | Sacchetti et al. | 95/104 |
| 4,786,477 | 11/1988 | Yoon et al. | 422/145 |
| 4,805,317 | 2/1989 | Inglis et al. | 34/1 |
| 4,832,711 | 5/1989 | Christel, Jr. et al. | 96/130 X |
| 4,863,494 | 9/1989 | Hayes | 95/108 |
| 4,869,734 | 9/1989 | Jacquish | 96/144 X |
| 4,930,294 | 6/1990 | Meier | 55/180 |
| 4,935,114 | 6/1990 | Varma | 204/157.43 |
| 4,967,486 | 11/1990 | Doelling | 34/259 |
| 5,087,272 | 2/1992 | Nixdorf | 55/96 |
| 5,165,900 | 11/1992 | Miksitz | 422/213 |
| 5,187,131 | 2/1993 | Tiggelbeck et al. | 95/104 X |
| 5,282,886 | 2/1994 | Kobayashi et al. | 95/131 |

FOREIGN PATENT DOCUMENTS

| | | |
|---|---|---|
| 2107717 | 8/1972 | Germany . |
| 2082082 | 3/1982 | United Kingdom ............ 96/130 |

OTHER PUBLICATIONS

Dow "Polymeric Adsorbent XUS 43493" Technical Bulletin 3.03, The Dow Chemical Company Form No. 177–01505–393, Feb. 1993 (4 pages).

Dow "Polymeric Adsorbent XU 43502" Technical Bulletin 2.03, The Dow Chemical Company Form No. 177–01506–393, Feb. 1993 (1 page).

*Primary Examiner*—Robert Spitzer
*Attorney, Agent, or Firm*—Flynn, Thiel, Boutell & Tanis

[57] ABSTRACT

A process and apparatus wherein an adsorption media, containing contaminants adsorbed from a contaminated gas stream, are contained in a media chamber. This chamber is defined by a generally cylindrical vessel, and the adsorption media comprises a polymeric material in particulate or bead form. The media chamber is defined in surrounding relationship to an elongate hollow guide tube which extends longitudinally along the central axis of the chamber. A microwave generator supplies microwave energy into the guide tube which functions as a waveguide. This waveguide has a plurality of slots formed therein which functions as radiators for the microwave energy. The microwave energy passes radially outwardly from the waveguide into the surrounding media throughout the length thereof to effect uniform heating of the media both longitudinally and radially. This heating effects release of the contaminants from the adsorbent media, which volatiles are then sucked out of the media.

25 Claims, 5 Drawing Sheets

REGENERATIVE APPARATUS FOR RECOVERY OF VOLATILES

FIELD OF THE INVENTION

This invention relates to an improved method and apparatus for recovering volatiles separated from a gas stream and, in particular, to an improved method and apparatus which permits efficient recovery of volatiles from collecting media by use of microwave energy.

BACKGROUND OF THE INVENTION

A process and apparatus for the continuous cleaning of contaminated waste air, for example waste air containing organic vapors, is described in U.S. Pat. No. 4,930,294 (Meier). In the process and apparatus of this '294 patent, an adsorption media is stored in a tank or vessel to define an adsorption bed, and vapor-containing waste air is supplied to the bed. In passage of the waste air through the bed, the organic vapors collect on or are adsorbed by the bed media, whereupon the air from which the contaminants or vapors have been removed then passes out of the bed for discharge as desired. Thereafter the bed on which the contaminants are collected or adsorbed is isolated from the waste air supply, and microwave energy is supplied to heat the bed media and effect release of the vapors from the bed media, with the vapors when being sucked out of the bed for collection. The process and apparatus of the type described in the '294 patent, as well as variations of such process and apparatus, are known, but nevertheless have not proven to operate in a desirable and efficient manner.

In known arrangements having the overall structure and function as briefly summarized above, such arrangements have typically supplied the microwave energy to the bed at one of the bed peripheral surfaces, such as at an upper end of the bed as in the '294 patent, and the overall arrangement is such as to provide undesired concentration of microwave energy at selected regions of the bed. For example, when the microwave energy is supplied to the upper end of the bed as in the '294 patent, excessive heating can occur at the upper end of the bed, and insufficient heating can occur at the lower end of the bed, whereby a significant temperature gradient exists both longitudinally and/or transversely within the bed so that efficient and economical release and recovery of the contaminants or vapors is not achieved. This can also cause localized heating of such a nature as to damage the bed media. The contaminants also have a long travel path from the upper to the lower end of the bed, which reduces the efficiency of removal.

Accordingly, this invention relates to an improved process and apparatus for removing contaminants such as volatile organic compounds (VOCs) from waste air or gas by an adsorption media, and in particular to an improved process and apparatus which provides more effective separation of the volatiles from the adsorption media and the regeneration thereof so as to overcome disadvantages associated with prior processes and apparatus of this general type.

More specifically, in one embodiment of the improved process and apparatus of this invention, the contaminated air or gas stream is fed into an adsorption chamber containing a bed of adsorption media therein. This chamber in the preferred embodiment is defined by a generally cylindrical vessel, and the adsorption media preferably comprises a polymeric material in particulate or bead form. The volatiles such as VOCs are adsorbed by the adsorbent bed as the gas stream passes therethrough, with the air or gas stream then being discharged. The adsorbent bed is defined in surrounding relationship to an elongate hollow guide tube which extends longitudinally along the central axis of the bed. A microwave generator or transmitter is connected to and supplies microwave energy into the guide tube which functions as a tubular waveguide. This waveguide has a plurality of slots or openings formed therein which function as radiators for the microwave energy. The microwave energy passes radially outwardly from the waveguide into the surrounding bed throughout the entire length of the waveguide and bed to effect reasonably uniform heating both longitudinally and radially. This heating effects release of the volatiles from the adsorbent bed media, which volatiles are then sucked out of the bed and suitably collected.

In the process and apparatus of this invention, as aforesaid, the waveguide is provided with radiator openings formed therein in such a pattern as to provide for substantially uniform discharge of microwave energy therefrom throughout the length of the waveguide. For this purpose the waveguide may, in one variation of the invention, be provided with uniform openings throughout the length of the waveguide, with the density of these openings being increased throughout the length of the waveguide as the waveguide projects away from the microwave generator. More specifically, the size, shape, density and positional arrangement of the radiator openings are determined based upon the geometry of the vessel and particularly the geometry of the media bed and waveguide, as well as the frequency of the microwave energy supplied to the waveguide. A further variation, to achieve the desired uniformity of energy discharged throughout the waveguide length, is to increase the size of the openings along the waveguide length as the openings are spaced further from the microwave generator.

In another embodiment of the improved process and apparatus of this invention, the contaminated air or gas stream is utilized as a fluidizing substance which is part of a fluidized adsorption bed, which fluidized bed contains therein an adsorption media which is fluidized or maintained in suspension by the gas stream. In this manner the adsorption media adsorbs undesired volatiles from the gas stream so that latter is cleansed. The media can then be supplied to a regenerative vessel which has the general properties described above, namely an annular media chamber which surrounds a waveguide tube so that microwave energy can be discharged in a reasonably uniform manner both circumferentially and axially along the waveguide for distribution radially outwardly into the annular media bed to effect release of the volatiles from the media. Following release and removal of the volatiles, the media can then be discharged from the regenerative vessel and resupplied to the fluidized bed.

Other objects and purposes of the present invention will be apparent to persons familiar with processes and arrangements similar to the present invention upon reading the following specification and inspecting the accompanying drawings.

Certain terminology will be used in the following description for convenience in reference only, and will not be limiting For example, the words "upwardly" , "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said technology will include the words specifically mentioned, derivatives thereof, and words of similar import.

DETAILED DESCRIPTION

Figure 1:
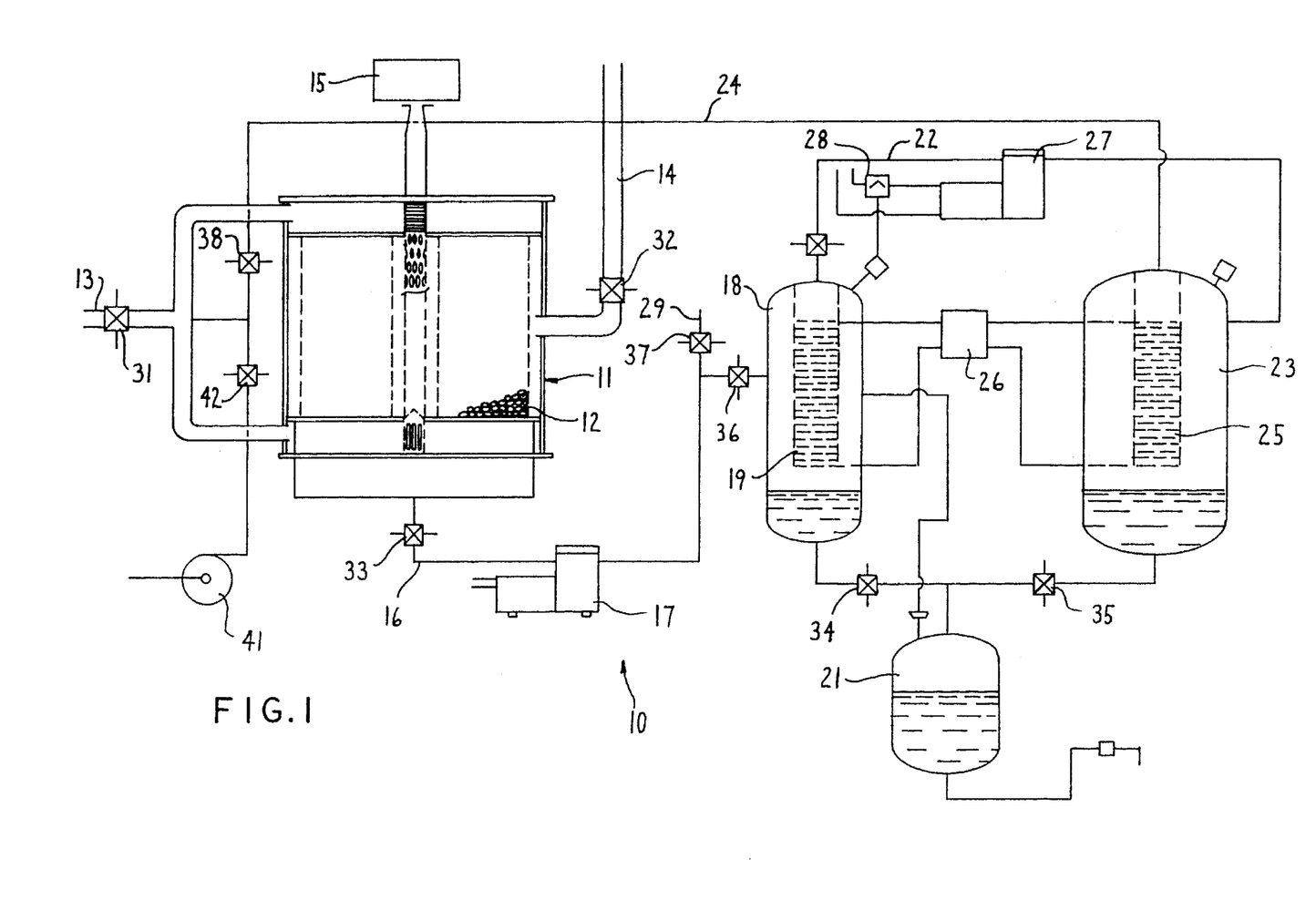
FIG. 1 is a schematic diagram of a system according to the invention.

Referring to FIG. 1, there is diagrammatically illustrated a system 10 for effecting separation of volatiles, normally organic compounds such as solvents, from an air or gas stream by means of an adsorption media. The system regenerates the media to effect release of the volatiles from the media to permit reuse thereof for subsequent collection of additional volatiles.

In the system 10, which will hereinafter be referred to as a regenerative adsorption system, there is provided a regenerative vessel 11 containing therein a bed of an adsorption media 12. An inlet passage 13 communicates with the vessel 11 for supplying a stream of contaminant-containing gas thereto, such as air, which gas stream contains undesired contaminants in volatile form, typically organic compounds. This gas stream is supplied into the adsorption vessel 11 whereupon the volatiles such as organic compounds (VOCs) are collected on the adsorption media to effect their separation from the gas stream. The cleansed gas is then discharged from the vessel 11 through an outlet passage 14.

A heating device 15, specifically a microwave generator, connects to the regenerative vessel 11 to effect heating and hence release of the volatiles from the adsorption media 12. These volatiles are drawn into a discharge passage 16 which has a suction or vacuum pump 17 associated therewith. The withdrawn volatiles are supplied through passage 16 to a primary condenser 18 having a cooling coil 19 associated therewith. The cooling of the volatiles in the condenser 18 causes condensation thereof whereby they can be suitably collected in a reservoir or tank 21.

The interior of the condenser 18 also communicates with a passage 22 which provides communication with a secondary condenser 23, the latter in turn communicating with a further passage 24 which communicates with the inlet passage 13. The secondary condenser 23 has a cooling coil 25 therein which couples to a refrigeration unit 26, which latter unit also couples to the coil 19 of the primary condenser 18. Any volatiles which condense within the secondary condenser 23 collect in the bottom thereof and are also suitably supplied to and collected in the tank 21.

The passage 22 which provides communication from the primary condenser 18 to the secondary condenser 23 has a pump 27 associated therewith for controlling flow to the secondary condenser 23. This pump 27 is activated in response to a pressure switch 28 which responds to the pressure within the primary condenser 18.

The secondary condenser 23 also functions as a storage reservoir for a pressurized purge gas, typically nitrogen, as explained hereinafter.

System 10 also includes a vent passage 29 which branches off of the discharge passage 16 between the pump 17 and the condenser 18. This vent passage may be vented directly to the environment or back to the overall main gas stream, depending upon the nature of the gas being handled.

A plurality of valves are also associated with various passages of the system 10 to provide control over flow throughout the system. For example, inlet and exit valves 31 and 32 are respectively associated with the inlet and outlet passages 13 and 14, a discharge valve 33 is associated with the discharge passage 16 upstream of the pump 17, tank valves 34 and 35 control flow from the condensers to the collecting tank 21, a control valve 36 associated with the passage 16 where it feeds into the main condenser 18, a control valve 37 is associated with the vent passage 29, and a control valve 38 controls flow through the passage 24.

Figure 2:
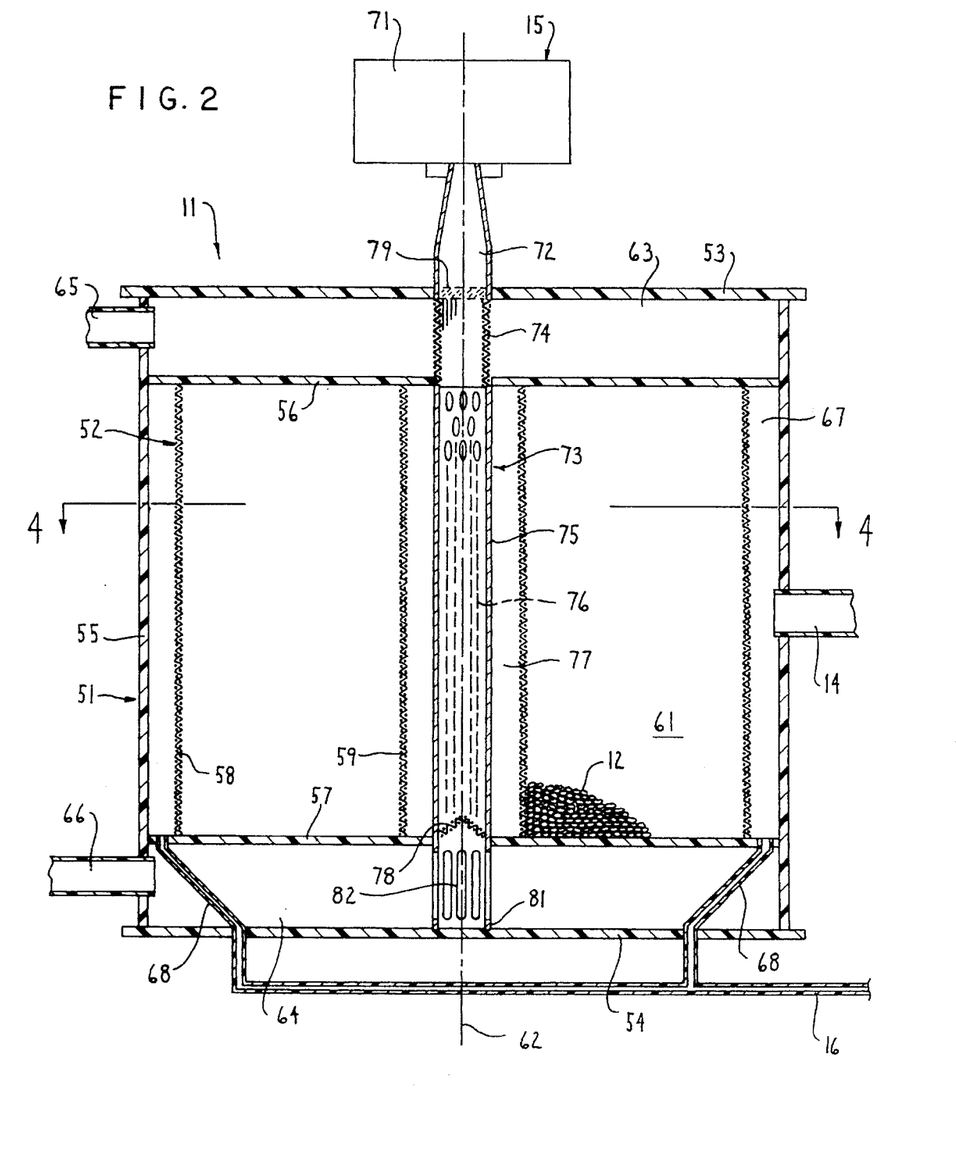
FIG. 2 is a diagrammatic elevational view, partially in cross section, of a regenerative apparatus according to the present invention for removing contaminants from a gas stream.
Figure 3:
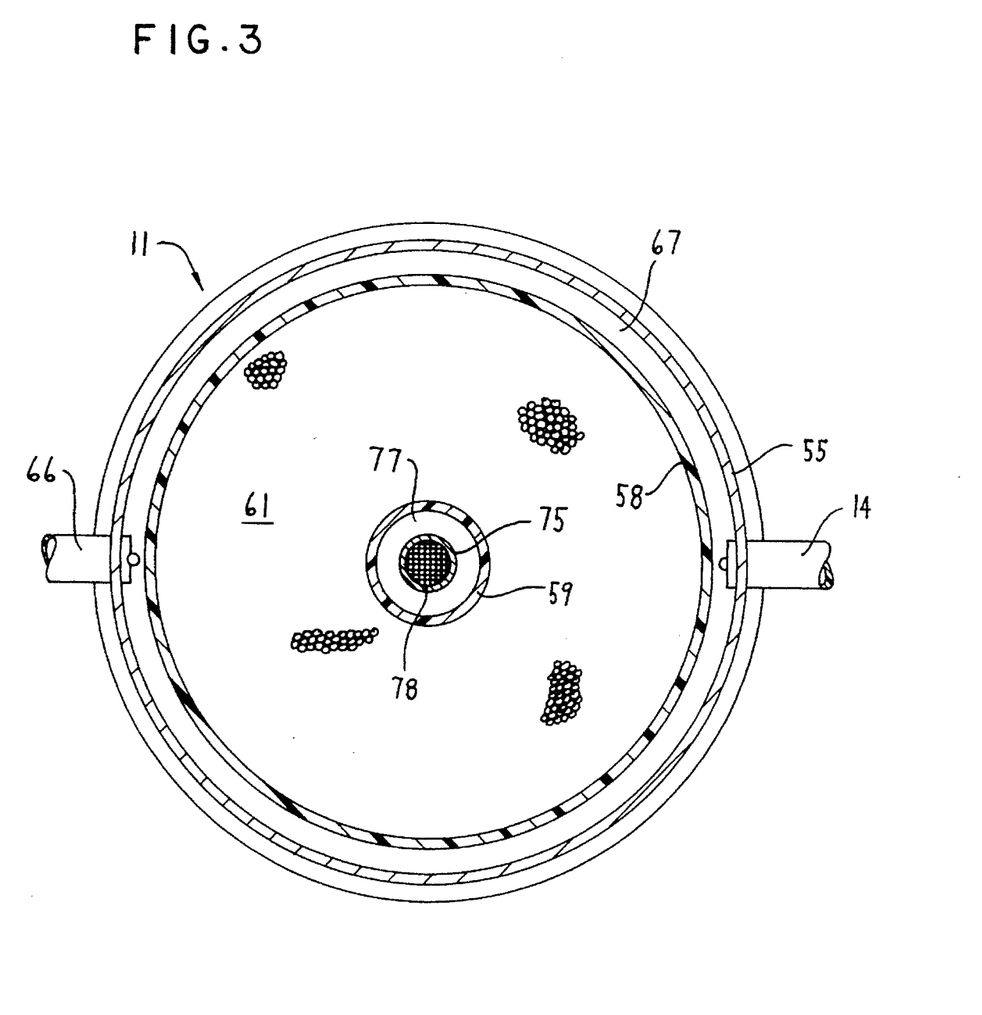
FIG. 3 is a view taken substantially along line 3—3 in FIG. 2.
Figure 4:
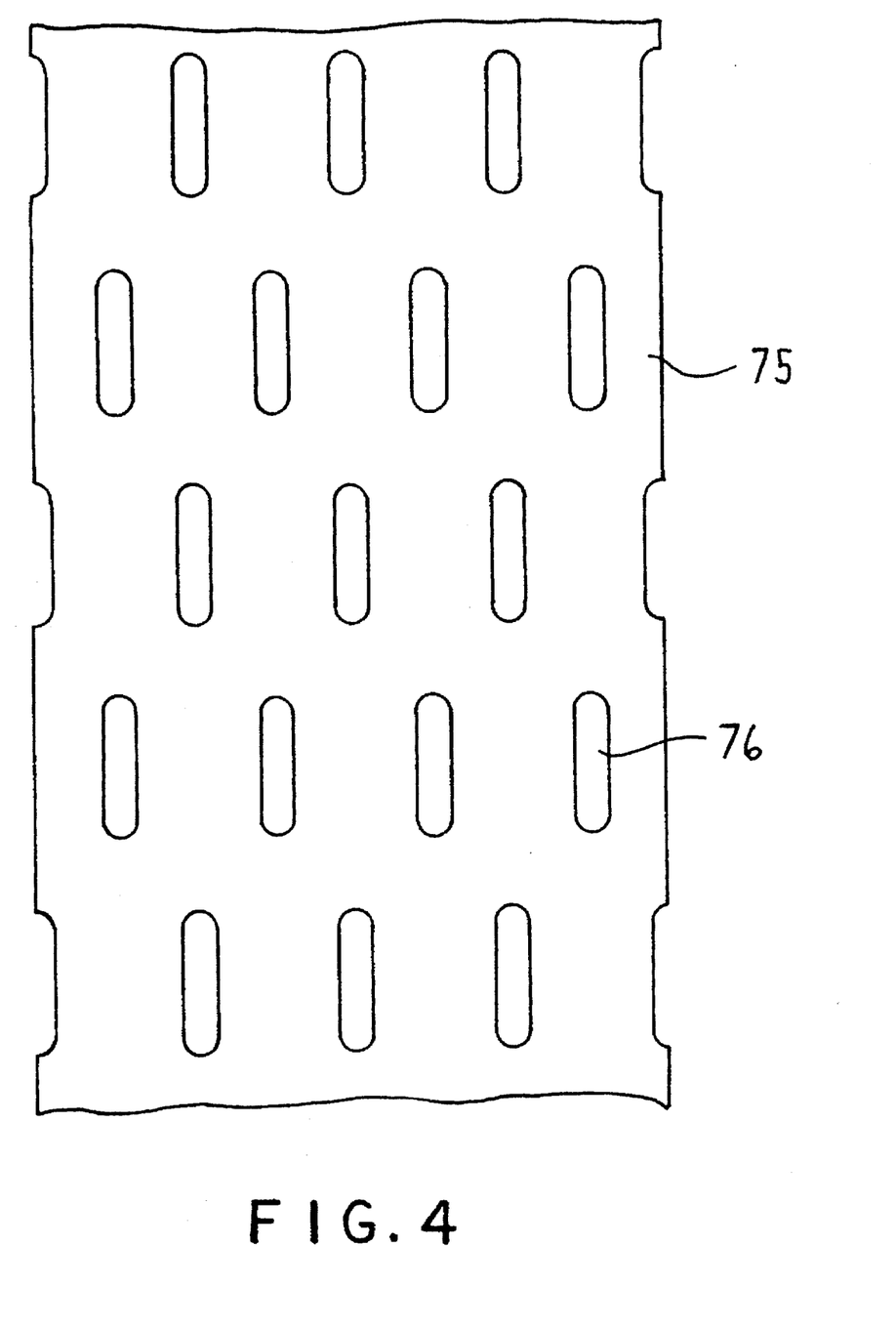
FIG. 4 is a diagrammatic view which illustrates the waveguide in a generally flattened condition for purposes of description.

Referring now to FIGS. 2–4, the construction and operation of the regenerative vessel 11 according to the present invention will now be described in greater detail.

The regenerative vessel 11 includes an outer hollow shell 51 of generally cylindrical configuration, and an inner hollow shell 52 which is also of generally cylindrical configuration and is positioned interiorly of the shell 51.

The outer shell 51 includes top and bottom walls 53 and 54, respectively, which are fixedly joined together by a generally cylindrical outer side wall 55 which is axially elongated and is disposed in concentric relationship about the longitudinal central axis 62 of the shells 51 and 52. The inner shell 52 similarly includes top and bottom walls 56 and 57, respectively, joined together by a cylindrical intermediate side wall 58 which is positioned radially inwardly from the outer side wall 55 in concentric relationship to the axis 62. Inner shell 52 also includes a generally cylindrical inner side wall 59 which is spaced radially inwardly from intermediate side wall 58 and is concentric about the axis 62, with inner annular side wall 59 also being joined between the top and bottom walls 56 and 57. The inner shell 51 defines therein an annular chamber 61 which extends radially between the walls 58 and 59 and axially between the end walls 56 and 57. This annular chamber is generally substantially filled with the adsorption media 12, as described hereinafter.

As illustrated by FIG. 2, the top walls 53 and 56 are axially spaced from one another, and the top wall 56 projects radially outwardly for connection to the outer annular side wall 55. An upper inlet chamber 63 is defined between the top walls 53 and 56.

In similar fashion, the bottom wall 57 is spaced upwardly from the bottom wall 54, and projects outwardly for connection to the outer annular side wall 55. A lower inlet chamber 64 is defined between the bottom walls 54 and 57.

The inlet chambers 63 and 64 respectively communicate with upper and lower branches 65 and 66 of the inlet passage 13.

The vessel 11 also defines therein an annular outlet chamber 67 which is defined between the radially spaced annular side walls 55 and 58, which outlet chamber 67 extends between the end walls 56 and 57. Outlet chamber 67 has a direct communication with the discharge passage 14. In the preferred embodiment, as illustrated by FIG. 2, the discharge passage 14 preferably communicates with the annular outlet chamber 67 at a location which is disposed in axially spaced relationship from the axial ends of the chamber, which communication location is preferably substantially midway between the axial ends.

The suction passage 16 also preferably communicates directly with this annular outlet chamber 67. In the illustrated embodiment the suction passage 16 communicates with a plurality of branched suction passages 68, the latter communicating with the lower end of the annular outlet chamber 67.

The heating device 15 comprises a microwave generator or transmitter 71 of conventional configuration, which generator will typically be operated so as to emit microwave energy at a selected frequency which may range from several Mhz to somewhat less than ten thousand Mhz. Within this range, the most practical frequencies are those in which power transmitters are commercially available, specifically from, but not limited to, about 890 to 925 Mhz, and 2,400 to 2,500 Mhz. This microwave generator 71 has the output thereof coupled through a transitional guide tube 72 to one end of an elongate tubular waveguide 73, the latter extending longitudinally and concentrically along the axis 62 throughout substantially the entire axial extent of the vessel 11. The waveguide 73 is positioned within and extends through the central opening defined by the inner annular wall 59 so as to be surrounded by the annular media chamber 61. The waveguide 73 is preferably of circular cross section and includes an upper tubular portion 74 which extends between the top walls 53 and 56 so as to extend across the upper inlet chamber 63. This upper portion 74 is constructed so as to be nontransparent to microwaves, and thus prevents transmission of microwaves outwardly into the upper inlet chamber 63. This upper waveguide part 74, however, is provided with suitable openings or perforations which are sized so as to readily permit gas to flow from chamber 63 into the hollow interior of the waveguide 73, although these openings or perforations are too small to permit escape of microwave frequency energy. In the preferred embodiment, this upper part 74 has a large plurality of openings which are generally uniformly distributed both circumferentially and axially thereof so as to provide generally unrestricted flow of gas from chamber 63 into the waveguide. This upper waveguide portion 74 is preferably constructed of a tubular metal screen or mesh.

The waveguide 73 also includes an elongate main radiator portion 75 which extends coaxially through the central opening defined by inner annular wall 59, with this main radiator portion 75 extending from the upper wall 56 to the lower wall 57. The radiator portion 75 is also preferably constructed as an elongate metallic sleeve so as to be generally nontransparent to microwave energy. This radiator portion 75, however, has a plurality of openings 76 formed therethrough both circumferentially therearound and axially therealong. The openings 76 are sized so as to permit microwave energy of the emitted frequency to pass radially outwardly through the openings 76 so as to be supplied to the media contained in the surrounding annular media chamber 61. These openings 76, in one variation, may be formed as axially elongate oval slots which are sized and configured to be a periodic structure in accordance with the frequency of the microwave energy which is to be emitted. These openings are distributed both axially and circumferentially of the waveguide tube part 75 so as to permit transmission of microwave energy radially outwardly into the surrounding annular media bed 61 throughout the entire circumferential and radial extent thereof.

According to a preferred embodiment of the invention, the elongate radiator portion 75 of the waveguide is preferably constructed of a tubular metal mesh or screen having a large number of small perforations disposed in a uniform fashion both circumferentially and axially thereof. The small perforations defined by the mesh or screen provide for uniform and unimpeded flow of gas radially outwardly from the waveguide into the surrounding media bed. This mesh or screen, however, due to the small size of the perforations, effectively acts as a nontransparent material with respect to the microwaves, and hence the microwaves can be radiated from the waveguide solely through the radiator openings 76.

The waveguide 73, at the lower end of the radiator portion 75, namely at the end opposite the microwave generator 71, may be provided with a waveguide terminator or reflector 78 extending thereacross. This reflector 78 causes any microwave energy which reaches the lower end of the tube part 75 to be reflected upwardly for distribution radially outwardly to the media chamber 61. To assist in such reflection and outward distribution, the reflector 78 is preferably of an upwardly oriented conical shape, although a flat shape will also be effective in reflecting the microwave energy.

The reflector 78 is also preferably formed of a metal mesh or screen, similar to the upper waveguide part 74, so as to be nontransparent to microwave energy and hence effect reflection thereof, but at the same time the reflector 78 readily permits gas to flow from the lower inlet chamber 64 into the interior of the waveguide part 75. The gas flowing into the waveguide part 75 is then disbursed radially outwardly throughout the radiator openings 76 so as to flow radially into and through the annular media chamber 61 throughout the circumferential and axial extent thereof.

The waveguide 73 preferably has an outer diameter which is somewhat smaller than the inner diameter of the inner annular wall 59, thereby resulting in formation of an annular distribution chamber 77 between the waveguide part 75 and the inner annular wall 59. This annular distribution chamber 77 generally extends axially throughout the length of the waveguide between the top and bottom walls 56 and 57 so as to provide for more uniform pressure and flow distribution of the gas for subsequent radial outward flow through the media 12 which fills the chamber 61. This chamber 77 also prevents localized heating of the bed directly at the radiator openings. The chamber 77 may have a radial clearance or width, as measured radially between the walls 59 and 75, of no more preferably than about one inch and preferably about ¼ to about ½ inch. However, the width of this chamber will be determined based on the overall geometry of the vessel and media bed, as well as the frequency of the microwave energy.

The waveguide 73 is also provided with a window 79 which closes off the input end thereof, which window 79 is located generally in the vicinity of the top wall 53. Window 79 is typically of quartz glass and, as is well known, is readily transparent to passage of microwave energy therethrough. This window 79, however, is nontransparent to gas flow and prevents the gas within the inlet chamber 63 from escaping back toward the microwave generator.

In the illustrated embodiment the waveguide 73 has a tubular lower part 81 which projects downwardly past the bottom wall 57 and across the lower inlet chamber 64 for connection to the bottom wall 54. When this lower tube part 81 is provided, which is preferred from the standpoint of structural assembly, then the lower part 81 is provided within a series of openings or slots 82 formed therein, which slots or openings extend circumferentially around the tube and provide communication over a significant axial extent thereof so as to provide for free and unimpeded flow of gas from chamber 64 into the tube part 81 and thence upwardly through the reflector 78 into the tube part 75 for flow outwardly into the annular media chamber 61. The lower tube part 81, in a preferred embodiment, may be constructed as a tubular metal screen or mesh similar to the tube part 74 described above, so long as the proper structural strength is maintained.

The intermediate and inner annular walls 58 and 59 are both constructed of a microwave transparent material, such as a plastic material, to permit microwave energy to readily pass therethrough. Both of these annular walls 58 and 59, however, are also provided with a large plurality of openings or perforations formed therethrough in a uniform manner both circumferentially and axially of the respective wall so as to provide for generally unimpeded flow of gas from the inner distribution chamber 77 radially outwardly through the annular media chamber 61 to the annular outlet chamber 67. These annular walls 58 and 59 are preferably constructed of a plastic screen or mesh so as to provide for supportive confinement of the media 12 while providing generally unimpeded flow of both gas and microwave energy therethrough. The end walls 56 and 57, however, are nonperforated so as to prevent gas or airflow therethrough, and in addition are constructed of materials which are nontransparent to microwaves. The outer annular wall 55 is similarly constructed of a material which is nontransparent to microwaves and to gas.

In a preferred embodiment of the invention, and as briefly described above, the radiator openings 76 are formed as axially elongated oval slots which are positioned both circumferentially around and axially along the waveguide 73 throughout the axial length of the media chamber. These radiator slots 76 are preferably rounded at the opposite ends or at the corners thereof. The slots will normally have an elongated (i.e. axial) length which will substantially exceed the circumferential width thereof. The distribution of the slots both circumferentially and axially along the waveguide will be such as to provide for reasonably uniform radiation of microwave energy throughout the circumferential and axial extent of the waveguide part 75 to provide for reasonably uniform heating both circumferentially and axially of the media within the media chamber. The slots 76, at least axially along the length of the tube part 75, will preferably be either a full guide wavelength or a half guide wavelength apart from slot center-to-center so as to maximize the radiation of energy through the slots.

Further, the size and configuration of the openings 76, particularly the axially elongate oval shape of the openings, coupled with the proper selection of the overall dimensional relationships of the vessel and waveguide, accordingly ensure that the microwave energy will be transmitted reasonably uniformly radially outwardly through the media in the chamber 61, and will reflect back off the outer annular wall 55 so as to provide substantially uniform heating throughout both the axial and radial extent of the media chamber. Thus, the media which is positioned adjacent the intermediate side wall 58 will have a temperature which closely approximates (although is normally a few degrees less than) the temperature of the media adjacent the cylindrical inner side wall 59.

While the embodiment of the waveguide and specifically the arrangement of the radiator slots 76 as described above is believed to represent one desirable approach for obtaining reasonably uniform heating of the media bed, it will be appreciated that other variations including variations of slot size, slot location and slot shape may be desirable to obtain the desired uniformity of microwave dissipation radially of the waveguide throughout the axial length thereof so as to achieve a desired degree of uniformity in heating. The design of the slots are periodic, and is dependent upon the particular mode of propagation and the geometry of the system.

Also, the slots may be probe-fed from a probe inserted into the waveguide adjacent to the slot. The probe-fed slot has advantages that allow for control of the energy. The slot design is also dependent upon the electromagnetic mode of propagation, for instance, and with the above arrangement a preferred mode may be the $TM_{01}$-mode.

The selection of the proper mode, waveguide and radiator slot physical parameters are determined by the particular constraints chosen for the complete vessel, i.e., the entire system should be designed from the start taking into account the electromagnetic response, while the objective is maximum adsorbed energy into the media bed and reasonably uniform heating thereof.

The entire interior system of vessel 11 (wherein the microwave energy is present) should be designed so as to minimize the voltage standing wave ratio ($V_{SWR}$) to allow for maximum transmitted power to the media bed and minimum power reflected back to the microwave source. Also, said system should be designed with sufficient bandwidth to accommodate the frequency variations from manufacturing tolerances in the microwave source, and the dimensional tolerances of the vessel and various components. Specifically, this is to allow commercially available microwave generators, and those currently being developed, to be used in this system.

Considering now the media 12, same is preferably in the form of small particles or beads which effectively fill the chamber 61 but which result in the bed defined by the beads having sufficient porosity as to enable the gas which is supplied through passage 13 to flow freely through the media bed and thence out the outlet passage 14. During its passage through the adsorption media, which passage will normally occur while maintaining the vessel substantially at room temperature, the volatiles are adsorbed by the media so that cleaned gas thus departs through the exit passage 14.

The media 12 preferably comprises plastic beads, specifically polymeric beads, which have an affinity for organic compounds whereby such compounds become adsorbed by the polymeric beads as the gas stream passes through the media within chamber 61. Such polymeric media, in a preferred embodiment, comprises a polymeric adsorbent manufactured and sold by Dow Chemical, two forms of which are known as XU43502 and XUS43493. The adsorbent material has a generally hydrophobic characteristic so that it is capable of adsorbing VOCs without removing water vapor which may also be contained in the gas stream.

The adsorbent media is preferably at least semi-nontransparent with respect to microwave energy so that, when microwave energy is applied to the media chamber, heating of the media occurs which in turn effects volatilization and release of the volatiles which are then subsequently sucked out of the media chamber.

The operation of the regenerative vessel 11 will now be briefly described.

A gas stream containing volatile contaminants such as VOCs or other hazardous air pollutants (HAP) is supplied through inlet passage 13 in a generally continuous manner for supply to the two inlet chambers 63 and 64. This incoming gas stream then flows into opposite ends of the waveguide 73, from which it then flows radially outwardly through the openings 76 (and through the perforated wall of the tube part 75) into the intermediate pressure distribution chamber 77, from which it then flows rather uniformly radially outwardly through the media 12 in chamber 61 and thence through the outer screen side wall 58 into the discharge chamber 67. The gas stream as it flows through the chamber 61 is cleaned inasmuch as the volatiles are adsorbed by the adsorbent media. The cleaned gas is thence supplied into the exit passage 14 for handling as desired. This latter passage will typically have a suction device connected thereto for causing, or at least assisting in, drawing of the gas stream into and through the adsorbent bed.

After the gas stream has been supplied through the adsorbent bed for a time period which is sufficient to result in a desired degree of saturation of the adsorbent bed, then the inlet 13 and outlet 14 are closed. Thereafter the microwave generator 71 is energized so that microwave energy is transmitted into the waveguide 73 and, within the part 75 thereof, is reasonably uniformly emitted into the distribution chamber 77 and thence into and radially outwardly through the media chamber 61, with the microwave energy reflecting off the walls 55, 56 and 57, as well as the outer surface of waveguide 73, back into the media so as to effect heating. This heating occurs with a reasonable degree of uniformity throughout both the axial and radial extent of the annular media bed 61. Because of this temperature uniformity, a minimal increase in temperature of the media can be utilized so as to effect release of the volatiles from the adsorbent media, which volatiles are then sucked from the chamber 61 into the discharge passage 16 for further handling as desired.

Considering now a preferred operation of the overall system 10 of FIG. 1, when said system incorporates therein the regenerative vessel 11 which operates substantially as described above, all of the valves in the system 10 are closed except for the valves 31 and 32 which allow the gas stream to be supplied into the vessel 11 so that the volatiles are adsorbed on the media, with the cleaned gas then being withdrawn through the exit passage 14. Once the adsorption media 12 is effectively saturated, the valves 31 and 32 are closed, and the valves 33, 37 and 38 are opened. This allows purge gas (i.e. nitrogen) to be drawn into the adsorbent bed so as to effectively purge the bed and remove any gas (such as oxygen) which might be of an explosive nature, which gas is discharged into the vent 29. The above-mentioned valves are then closed, and the microwave generator 71 is energized to initiate heating within the media bed. The generator 71 will remain energized until the media bed reaches a predetermined temperature, such as for example about 310° F., which temperature is sensed by one or more suitable temperature sensing probes (not shown) located in the media bed. Upon reaching the preset temperature, the microwave generator will be deactivated.

After activation of the microwave generator, and while the microwave generator 71 continues to operate, the temperature sensors sense a predetermined intermediate temperature of the media bed, such as for example approximately 210° F. This causes the vacuum device or pump 17 to be energized, and at that time the valves 33 and 36 are opened so that the vacuum pump then sucks the volatiles out of the media chamber into the condenser 18, whereby such volatiles are cooled and condensed. When a predetermined vacuum condition (such as for example a vacuum of 20 inch mercury) is sensed within the vessel 10 by a vacuum sensor (not shown), then the control valve 38 reopens so as to allow the inert purging gas (i.e., nitrogen) to be supplied through passage 24 into the media bed, and during this purging cycle the vacuum pump 17 will continue to suck out of the vessel 11. This purging cycle will continue until the vacuum sensor registers a lower predetermined vacuum pressure within the vessel 11 (such as for example 15 inches mercury), at which time the control valve 38 will reclose, but the sucking of volatiles from the bed by the pump 17 will continue. This continuous sucking cycle will continue over a period of time, and during which several purging cycles as described above will occur, normally between three and five such purging cycles being executed. After the requisite number of purging cycles have been executed, then the sucking will continue until the vacuum sensor indicates that a predetermined maximum vacuum (for example 23 inch mercury) has been achieved within the vessel 11. Such maximum vacuum pressure is indicative of completion of the operation, and the overall system will be shutdown so as to complete the regenerative cycle and place the system in condition to permit a gas stream to again be supplied through the inlet 13 into the adsorption bed.

Throughout the volatile sucking operation as described above, the microwave generator 71 may be turned on and off by the temperature sensor which will sense minimum and maximum temperatures within the media bed so as to appropriately re-energize the generator 71 when the bed temperature reaches a predetermined minimum (such as for example 280° F.) and which again deactivates the generator 71 when the bed temperature reaches the predetermined maximum (such as for example 310° F.).

During operation of the system 10 as described above, the volatiles withdrawn from the regenerative vessel will always be supplied into the primary condenser 18 by the pump 17, the latter operating substantially continuously during the sucking cycle. However, when the pressure switch 28 senses a buildup of pressure within the condenser tank 18, such as for example reaching a pressure of 12 psig, then this pressure switch 28 activates the pump 27 so as to supply gas from condenser 18 into the secondary condenser 23, whereupon further condensation of volatiles can occur. The gas will be supplied to the secondary condenser 23 until the pressure switch 28 senses that the pressure within main condenser tank 18 has returned to a lower limit, such as for example 3 psig, whereupon pressure switch 28 will again deactivate the pump 27 and isolate the secondary condenser from the primary condenser.

After completion of the sucking operation, but prior to initiating flow of a gas stream through inlet 13 into the vessel 11, it may be desirable to again purge the vessel 11 with a cooling gas so as to permit rapid cool down of the media. For such case, after the sucking cycle has been completed, then an auxiliary supply fan 41 can be energized and a control valve 42 associated therewith opened so as to permit air to be pumped into and through the adsorption bed so as to permit rapid cooling of the media. The valves 33 and 37 will also be opened during this cooling cycle so as to permit discharge of the air into the vent passage 29. After appropriate cooling, then the valves are closed and the fan de-energized so as to permit a contaminated gas stream to again be supplied into the vessel 11 so as to initiate a new adsorption cycle.

While the regenerative vessel 11 and the overall regenerative system as illustrated in FIGS. 1–4 have been described above in association with a batch-type operation and process, it will be appreciated that the regenerative vessel 11 can also be coupled to and used in association with a fluidized adsorption bed which is separate from the regenerative vessel.

Figure 5:
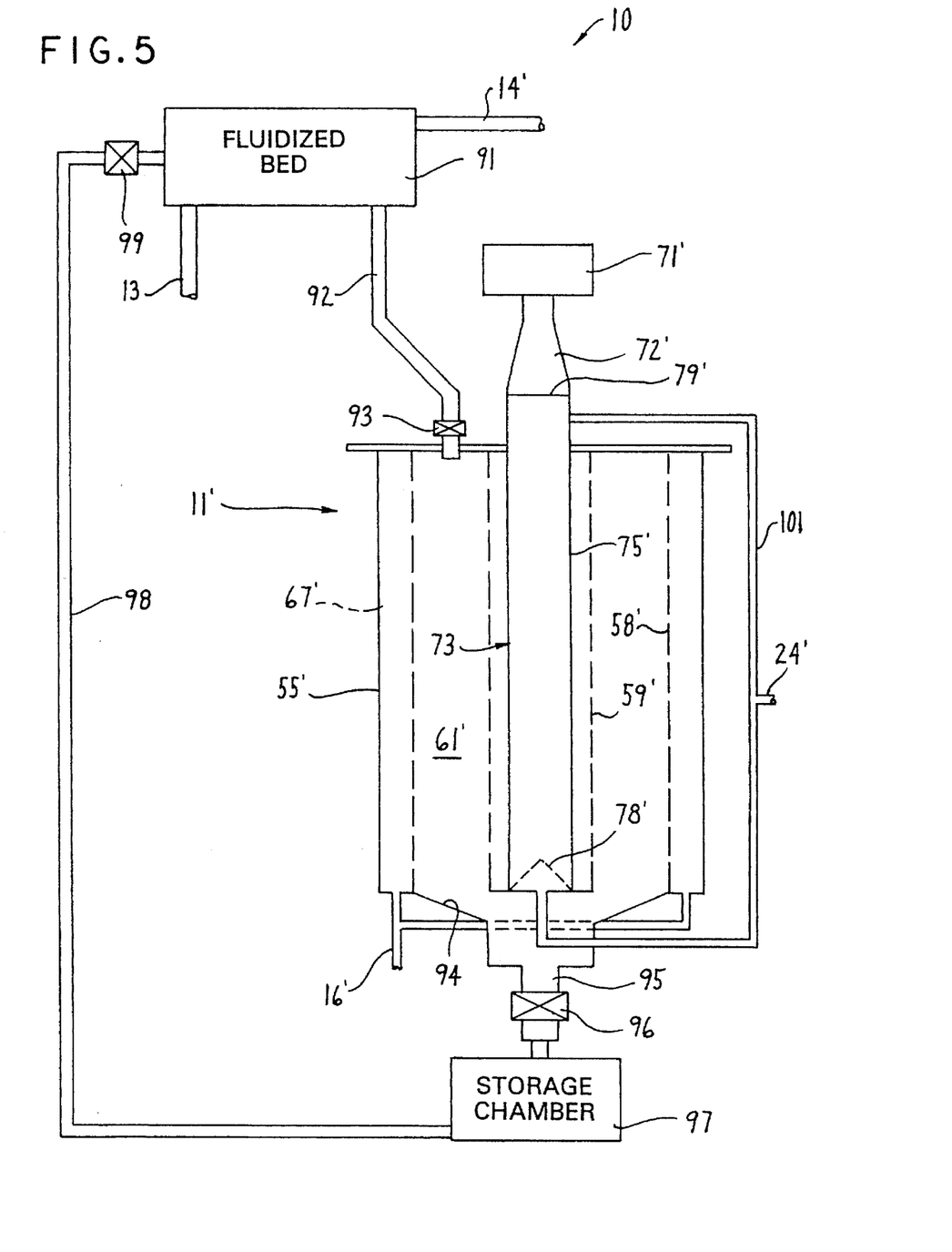
FIG. 5 is a variation of the invention showing the regenerative apparatus coupled to a fluidized bed.

In this regard, reference is made to FIG. 5 wherein a regenerative vessel 11' is coupled to a fluidized adsorption bed 91. The regenerative vessel 11' of FIG. 5 incorporates therein many of the same structural and functional features as the vessel 11 described above. Corresponding parts of the vessel 11' of FIG. 5 have hence been designated by the same reference numbers used in FIGS. 1–4 above but with the addition of a prime (') thereto. Because these corresponding parts have substantially the same structural and/or functional relationships, these corresponding parts will not again be described in detail.

The vessel 11' is coupled to a conventional fluidized adsorption bed unit indicated diagrammatically at 91. This fluidized bed adsorption unit 91 is generally conventional in that it includes a housing in which a collection of particulate media, specifically an adsorption media as described above, is contained so as to define a bed. The contaminated gas stream is supplied through the inlet 13' into the bed unit wherein the contaminated gas stream maintains the adsorbent media in a suspended or fluidized condition in a manner which is well known, and during this time has intimate contact with the adsorption media such that the undesired contaminates, specifically the volatiles, are adsorbed by the media particles. The gas stream, in at least a partially cleaned condition, is then removed from the bed unit through the exit passage 14'.

When it is determined that the adsorption particles within the bed unit have reached a sufficient saturation point as to require removal of contaminates therefrom, then the particles are discharged through passage 92, which contains a flow control valve 93 therein, into the upper end of the annular media chamber 61' defined within the regenerative vessel 11'. Normally a sufficient quantity or batch of media particles will be discharged into the chamber 61' so as to substantially fill the chamber.

After the chamber 61' has been filled and the valve 93 closed, then the regenerative vessel 11' is energized so as to effect removal of volatiles from the adsorption media in substantially the same manner as described above relative to the vessel of FIGS. 2–4.

As illustrated by FIG. 5, the lower end of media chamber 61' is defined by a truncated conical wall 94 which slopes downwardly to a center discharge passage 95 having a control valve 96 associated therewith, which passage in turn feeds the regenerated media particles by gravity to an intermediate storage chamber 97. The particles can be withdrawn from the chamber 97 through a suitable supply passage 98 for resupply to the fluidized bed 91. A suitable control valve 99 can be associated with the passage 98.

In the vessel 11' of FIG. 5, the purge passage 24' connects to the branch tube 101 which communicates with opposite ends of the microwave tube 73' so as to permit supply of purge or cooling gas or air into and through the bed if necessary or desired.

With the arrangement of FIG. 5, the adsorbent media supplied to the chamber 61' is already substantially saturated with volatiles or contaminants, having been exposed to the volatiles while being utilized in the fluidized bed 91. Hence, the overall construction of the vessel 11' is simplified in that an inlet chamber or chambers for the waste gas or air need not be provided.

The remaining operation of the arrangement of FIG. 5 is sufficiently similar to the regenerative operation of FIGS. 2–4 as to not require further detailed description thereof.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A process for removing contaminates in volatile form from a particulate adsorption media, comprising the steps of:

providing a large plurality of particles of adsorbent media within an annular media chamber so as to define a media bed, said adsorbent media containing contaminates adsorbed therein;

providing an elongate tubular waveguide which extends coaxially through and is surrounded by said media chamber;

supplying microwave energy into the interior of said waveguide and then emitting such microwave energy radially outwardly through the waveguide both circumferentially and axially thereof to provide for reasonably uniform heating within the media chamber to effect release of the contaminates from the adsorption media; and applying a suction to said media chamber to withdraw the volatiles therefrom.

2. A process according to claim 1, including the step of supplying an inert purging gas into and through the media bed throughout a portion of the suction step.

3. A process according to claim 2, including the step of supplying an inert purging gas into and through the media bed prior to the supplying of microwave energy thereto so as to effect removal of potentially explosive gases from the bed.

4. A process according to claim 2, including the step of supplying a cooling gas into and through the media bed to effect cooling of the media following completion of the suction step.

5. In an apparatus including a hollow vessel defining therein a media chamber for containing an adsorption media on which volatiles are collected, and a microwave generating device communicating with the media chamber to effect separation of the volatiles from the adsorption media, comprising the improvement wherein:

said media chamber is of an elongate annular configuration defined about a longitudinal axis and having an elongate central opening extending coaxially and longitudinally thereof; and an elongate tubular waveguide connected to said microwave generating device and extending longitudinally of said central opening throughout substantially the longitudinal length of said media chamber, said waveguide having a plurality of microwave radiator openings formed therethrough both circumferentially and longitudinally thereof for emitting microwave energy into the annular media chamber to effect release of the volatiles from the adsorption media.

6. An apparatus according to claim 5, wherein said waveguide includes a microwave reflector disposed thereacross adjacent an end thereof opposite an end connected to the microwave generating device.

7. An apparatus according to claim 5, wherein the radiator openings in said waveguide are of an elongated slot like configuration.

8. An apparatus according to claim 5, including a gas supply inlet communicating with said waveguide adjacent at least one end thereof for supplying a gas stream into said waveguide for distribution therethrough into said annular media chamber.

9. An apparatus according to claim 8, wherein said waveguide includes a reflector disposed thereacross adjacent an end thereof opposite an end connected to the microwave generating device, and wherein said gas supply inlet communicates with both ends of said waveguide.

10. An apparatus according to claim 5, wherein said vessel includes longitudinally elongate and radially spaced inner and intermediate annular walls positioned concentrically about one another and about the longitudinal axis and defining said annular media chamber therebetween, said inner and intermediate annular walls being substantially uniformly perforated to permit flow of gas therethrough and being of a microwave transparent material, said inner annular wall defining said central opening, an end wall joined to said inner and intermediate annular walls and closing off an end of said annular media chamber, said end wall being nontransparent to microwaves, and a longitudinally elongate outer annular wall positioned radially spaced from and concentrically about said intermediate annular wall so as to define an elongate outer annular chamber therebetween, said outer annular wall being of a nontransparent microwave material.

11. An apparatus according to claim 10, wherein said waveguide is positioned concentrically within and spaced radially from said inner annular wall to define an elongate inner annular chamber therebetween.

12. An apparatus according to claim 10, wherein a gas discharge passage communicates with said outer annular chamber.

13. An apparatus according to claim 10, including a gas supply inlet communicating with said waveguide adjacent at least one end thereof for supplying a gas stream into said waveguide for distribution therethrough in said annular media chamber.

14. An apparatus according to claim 13, wherein a gas discharge passage communicates with said outer annular chamber.

15. An apparatus according to claim 14, wherein said waveguide is positioned concentrically within and spaced radially from said inner annular wall to define an elongate inner annular chamber therebetween.

16. An apparatus according to claim 14, wherein said vessel includes upper and lower walls which define upper and lower inlet chambers defined adjacent opposite axial ends of the vessel and adjacent opposite axial ends of the media chamber, said upper and lower inlet chambers communicating with opposite ends of said waveguide for supplying gas into said waveguide, and said gas supply inlet communicating with both of said upper and lower inlet chambers.

17. An apparatus according to claim 14, wherein a volatiles discharge passage communicates with said outer annular chamber.

18. A system for removing volatile contaminants from gas, said system comprising:

a closed vessel defining therein an annular media chamber containing a particulate media which can adsorb volatile organic compounds from a gaseous carrier, said annular media chamber defining an axially elongate central opening extending coaxially therethrough;

said vessel including an outer sleevelike wall which is generally concentric with and spaced radially outwardly from said annular media chamber so as to define an annular discharge chamber therebetween;

an elongate tubular microwave waveguide positioned coaxial with and extending axially through said central opening, said waveguide having a plurality of microwave transmitting openings formed radially therethrough in circumferentially and axially spaced relation therealong;

a microwave generator coupled to said waveguide for transmitting microwave energy into the interior of said waveguide, said microwave energy being emitted radially outwardly through said transmitting openings into the surrounding media chamber;

a gas exhaust passage communicating with said annular discharge chamber, said exhaust passage having a valve associated therewith for controlling flow therethrough;

an inlet passage communicating with the interior of said waveguide for supplying a gas stream into said waveguide for distribution radially outwardly therethrough into the media so as to effect separation of volatiles from the gas stream;

a volatiles discharge passage communicating with said closed vessel for removing volatiles from said annular media chamber when said media chamber is heated by said microwave generator to effect separation of the volatiles from the media; and a condenser connected to said volatiles discharge passage for receiving the volatiles as separated in said media chamber and for condensing the volatiles to permit collection thereof.

19. A system according to claim 18, including a control valve in said volatiles discharge passage, and a suction device associated with said volatiles discharge passage for sucking volatiles from the media chamber and supplying the volatiles to the condenser.

20. A system according to claim 19, including a purge passageway communicating with the interior of said closed vessel for supplying a purge gas thereto to effect cooling of the media after heating thereof by the microwave generator.

21. A system according to claim 18, including a fluidized bed adsorption unit containing therein said particulate media which is maintained in fluidized suspension by a gas stream supplied to the bed unit, said particulate media being capable of adsorbing contaminates from the gas stream, and passage means for providing transfer of media from the fluidized bed adsorption unit to the annular media chamber defined within said closed vessel.

22. A system for removing contaminates from a gas stream, comprising:

a fluidized bed adsorption means for adsorbing contaminates from a gas stream into a particulate adsorption media which is maintained in a fluidized suspension by the gas stream;

a regenerative apparatus for removing contaminates from the particulate adsorption media, said regenerative apparatus including a hollow vessel defining therein a media chamber for containing the adsorption media on which contaminates are collected, and a microwave generating device communicating with the media chamber to effect separation of the contaminates from the adsorption media;

said media chamber as defined by said vessel being of an elongate annular configuration defined about a longitudinal axis and having an elongate central opening extending coaxially and longitudinally thereof;

said regenerative apparatus including an elongate tubular waveguide connected to said microwave generating device and extending longitudinally of said central opening throughout substantially the longitudinal length of said media chamber, said waveguide having a plurality of microwave radiator openings formed therethrough circumferentially and longitudinally thereof for emitting microwave energy into the annular media chamber to effect release of the contaminates from the adsorption media;

a flow-controlled media supply passage connecting said fluidized bed adsorption means to said media chamber for permitting flow of media from the bed adsorption means to said media chamber; and a flow-controlled media discharge passage connected to said media chamber for permitting discharge of media therefrom upon completion of the removal of contaminates therefrom.

23. A system according to claim 22, including a flow-controlled suction passage communicating with said media chamber for permitting withdrawal of contaminates therefrom upon release of the contaminates from the media chamber due to heating by the microwave generator.

24. A system according to claim 23, wherein said media supply passage communicates with an upper end of said media chamber, and said media discharge passage communicates with a lower end of said media chamber.

25. An apparatus for removing volatile contaminants from a gas, said apparatus comprising:

a closed vessel defining therein an annular media chamber containing a particulate media which can absorb volatile contaminants from a gaseous carrier, said annular media chamber defining an axially elongate central opening extending coaxially therethrough;

said vessel including an outer sleevelike wall which is generally concentric with and spaced radially outwardly from said annular media chamber so as to define an annular discharge chamber therebetween;

an elongate hollow tubular member positioned coaxial with and extending axially through said central opening, said tubular member having a plurality of openings formed radially therethrough in spaced relation therealong;

an inlet passage communicating with an interior of said tubular member for supplying a gas stream into said tubular member for distribution radially outwardly therethrough into said particulate media so as to effect separation of volatile contaminants from the gas stream;

a microwave generator communicating with the media chamber to effect separation of the volatile contaminants from the media contained in the media chamber, said microwave generator being coupled to one end of said tubular member for transmitting microwave energy thereto for distribution therefrom into the annular media chamber; and an exhaust passage communicating with said annular discharge chamber for discharging gas therefrom.

* * * * *

UNITED STATES PATENT AND TRADEMARK OFFICE
CERTIFICATE OF CORRECTION

PATENT NO. : 5,509,956
DATED : April 23, 1996
INVENTOR(S) : Stephen H. Opperman et al It is certified that error appears in the above-indentified patent and that said Letters Patent is hereby corrected as shown below:

Column 15, line 21; change "absorb" to ---adsorb---.

Signed and Sealed this

First Day of October, 1996

Attest:

BRUCE LEHMAN

Attesting Officer

Commissioner of Patents and Trademarks